INVENTOR
JOSEPH FEATONBY

United States Patent Office 2,712,482
Patented July 5, 1955

2,712,482

BALL BEARING THRUST RACES

Joseph Featonby, Ottawa, Ontario, Canada, assignor to National Research Council, Ottawa, Ontario, Canada, a corporation of Canada Application January 16, 1952, Serial No. 266,689

Claims priority, application Canada December 6, 1951

5 Claims. (Cl. 308—233)

This invention relates to an improved thrust bearing.

The thrust races now in use for high speed applications such as turbines usually comprise bearings of the angular contact type. In such bearings the thrust component of the centrifugal force will always be less than the radial component of the centrifugal force due to the angle of contact and where large thrust loads have to be taken this type is usually preloaded in pairs. Alternatively, elaborate thrust balancing mechanisms are introduced to distribute the thrust loads over more than one bearing thrust face. Both of these expedients are cumbersome, expensive and not entirely satisfactory in performance.

In the conventional single row thrust ball bearing where axial displacement can take place between the thrust races the balls will accommodate themselves to balance the centrifugal and thrust loads unless restrained by cages but due to the radius of curvature of the track and large change in contact angle there would be a large axial displacement. This large displacement will usually make the use of such a bearing impractical.

In the conventional double row thrust ball bearing the balls are restrained axially and accommodate themselves to balance thrust and centrifugal force by imposing excessive loads on the balls and races as they set themselves so that the difference of their thrust components is equal to the applied thrust. The consequence is increased wear and reduced bearing life. Deformation of the balls may cause spinning of the balls and a further increase in wear.

An object of the present invention is to provide a ball race for use at high speed and under high thrust loads in which the applied axial thrust will be balanced by the axial component of the centrifugal force, which is within a limited range during normal operation; thus giving a condition of equilibrium.

A further object of this invention is to achieve this condition of equilibrium under conditions where large axial movement cannot be tolerated.

Another object of the present invention is to avoid imposing loads on the balls and races which are in excess of the applied thrust and centrifugal force components.

It is also an object of this invention to provide a thrust bearing in which at normal operating speeds and thrust loads the balls will solely be in contact with the opposed faces of the races and will not additionally be in contact with any inner or outer retaining wall other than incidental contact with a cage.

In accordance with the present invention there is provided a thrust race comprising opposed annular races facing in a direction approximately parallel to the axis of rotation and being capable of small relative axial displacement. Balls are placed in the races and the races are shaped to give outer ball retaining portions which are inwardly inclined at an angle making the axial component of the centrifugal force of the balls under normal operating conditions balance the applied axial thrust.

In the drawings which illustrate the preferred embodiments of this invention:

Figure 1:
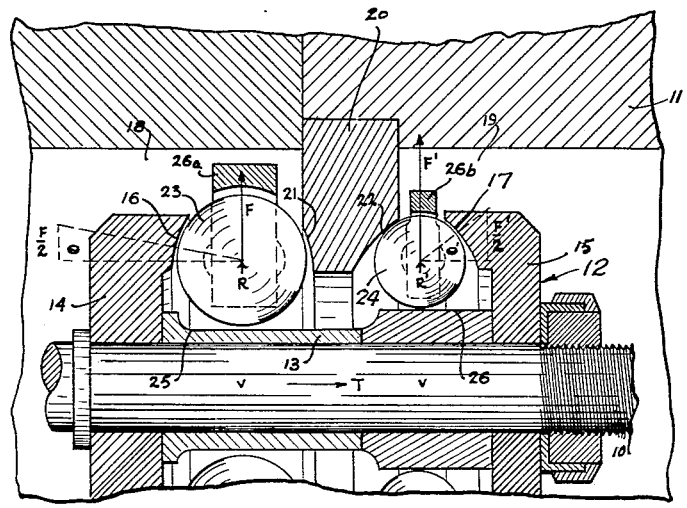
Figure 1 is a sectional elevation view of one embodiment of a thrust race.

The embodiment illustrated in Figure 1 comprises a shaft 10 rotating within a housing 11. Secured to shaft 10 is a collar indicated generally at 12 and including a base portion 13 and end portions 14 and 15. The upper portions of the inner walls of these end portions are inwardly inclined as at 16 and 17, to form the outer ball retaining portions of the races of a main bearing indicated generally at 18 and a loacting bearing indicated generally at 19.

An annular collar 20 secured to housing 11 further defines the bearings. Collar 20 has an inclined face 21 opposing wall 16 and forming the other outer ball retaining portion for bearing 18 and an inclined face 22 opposing wall 17 and forming the other outer ball retaining portion for bearing 19.

A plurality of balls 23 are annularly disposed within the main bearing 18 defined by wall 16, face 21 and base 13; and other balls 24 are annularly disposed within the locating bearing 19 defined by wall 17, face 22, and base 13. Normally, the diameter of the balls in the locating bearing is less than that of the balls in the main bearing and therefore base portion 13 is stepped to provide a lower surface 25 beneath the balls of the main bearing and an upper surface 26 beneath the balls of the locating bearing. Spacing elements or cages 26a and 26b may be used.

During normal operation shaft 10 in Figure 1 is subject to an axial thrust T lbs. in a direction running from the main bearing to the locating bearing. The speed of the balls in both the main and locating bearings is $w$ radians/sec. producing a centrifugal force F in balls 23 and a centrifugal force F' in balls 24. If the diameters of the balls in the main and locating bearings are $d$ and $d'$ respectively, the weight of the balls W and W', the number of the balls $n$ and $n'$ and the radius of rotation of the balls is R and R' respectively, this being measured from the axis of the shaft to the centres O and O' of the balls; the centrifugal force per ball will be given by the relationships (1) $\dfrac{WRw^2}{g}$ for the main bearing (2) $\dfrac{W'R'w^2}{g}$ for the locating bearing Each race will carry half the load which will be (3) $\dfrac{WRw^2n}{2g}$ for the main bearing (4) $\dfrac{W'R'w^2n'}{2g}$ for the locating bearing In accordance with this invention the axial component of the centrifugal force in the main bearing is to balance the total thrust which will comprise the axial thrust T plus the axial component of the centrifugal force in the locating bearing. Where $\theta$ is the angle of contact between balls 23 and face 16 or 21 of the main bearing and $\theta'$ is the angle of contact between balls 24 and face 17 or 22 of the locating bearing; the following relationship must be satisfied.

(5) $\dfrac{T+\cot\theta'(W'R'w^2n')}{2g}=\cot\theta\dfrac{(WRw^2n)}{2g}$ or (6) $\cot\theta=\dfrac{2gT+\cot\theta'W'R'w^2n'}{WRw^2n}$ Therefore faces 22 and 17 of the locating bearing will be inclined at an angle which will give an arbitrarily chosen contact angle $\theta'$ and the proper angle of inclination of the faces 16 and 21 of the main bearing may then be calculated knowing the applied thrust, the speed during normal operation and the dimensions of the bearing other than the inclination of the faces of the main bearing. The contact angle $\theta$ for the main bearing ranges between 2 and 30 degrees with present bearing materials. If improved materials are developed or at relatively low speeds a lower limit of one degree should be feasible. The preferred value of $\theta$ for normal operation is between 5 and 15 degrees. The contact angle $\theta'$ for the locating bearing ranges between about 45 and 60 degrees.

Faces 16 and 21 are shown as being slightly concave. They may also be convex or planar as long as they are shaped so that under normal operating conditions of thrust and speed the contact angle $\theta$ is the calculated figure. If there is a variation in the thrust T the shape of the faces will be of importance; increasing the thrust T will result in moving the balls 23 of the main bearing towards the axis of the shaft. With a concave race there will be a decrease in contact angle $\theta$ with a consequent increase in the cotangent of $\theta$ and therefore an increased axial thrust component of the balls in the main bearing to oppose the increased thrust. Similarly if there is an increase over the normal speed of rotation of the shaft, balls 23 will move outwards in preference to smaller balls 24, there will be an increase in $\theta$, a decrease in cotangent $\theta$ and therefore the product of the increased centrifugal force and the cotangent of the new contact angle will be approximately constant. The shape of the races is therefore of some importance where accommodation to varying thrusts and speeds of rotation is required. However, in turbines the thrust and speed under normal operating conditions will be fairly constant.

Figures 2, 3:
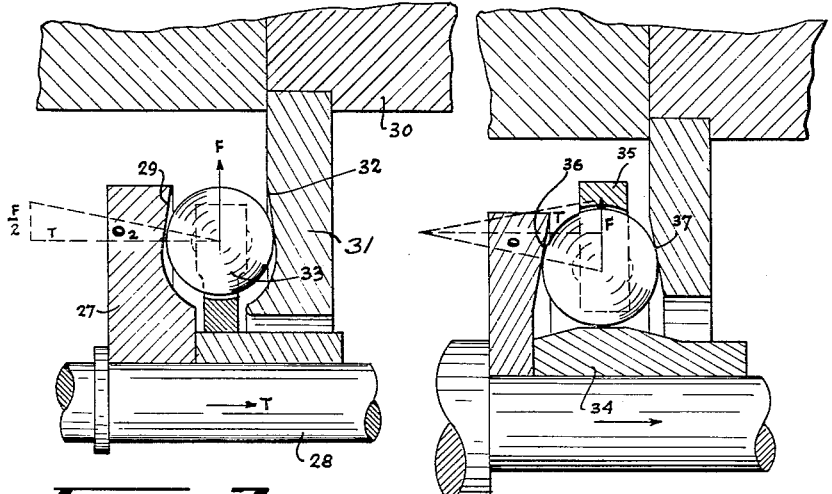
Figure 2 is a sectional elevation view of another embodiment.
Figure 3 is a sectional elevation view of a further embodiment.

In the embodiment illustrated in Figure 2 there is shown a thrust bearing in which the locating bearing is omitted. A collar 27 is fastened to shaft 28 and provides an inclined race face 29 the upper portion of which is shown as being planar. The shaft is journalled in a bushing 30 having secured within it an annular collar 31 which has an inclined planar race face 32. Load bearing elements 33 are disposed between the opposed races.

In the embodiment of Figure 2, since there is no locating bearing the axial thrust component of the centrifugal force will balance the applied thrust when:

(7) $$\cot \theta_2 = \frac{2gT_2}{W_2 R_2 w_2^2 n_2}$$

where the letters used have a similar significance to those employed in the description of the first embodiment.

Figure 3 shows another form of thrust bearing omitting the locating bearing and having a base 34, a cage 35 and in which the races 36 and 37 are entirely flat.

The example which follows shows the calculation of the contact angles of a thrust bearing in accordance with the principles specified above.

*Example*

R. P. M. 8000, thrust load 2050 lbs.
Balls, .75" diameter, weight .0625 lbs., pitch circle radius 2", number of balls, 13
Speed of balls, $$\frac{8000}{2} \text{ R. P. M.}$$

or $2\pi$ 66.7 radians/sec. ($w$)
Centrifugal force per ball, $$\frac{.0625 \times 2 \times 419^2}{386.4} = \frac{WRw^2}{g} = 56.7 \text{ lbs.}$$

each race carries half the load $28.35 \times 13 = 369$ lbs.

Locating bearing:
Balls, .5" diam., weight, .0185 lbs., radius, 1.75", No. 13, $\theta'$ 45°
Therefore cot $\theta' = 1$ $$\text{C. F./ball} = \frac{.0185 \times 1.75 \times 419^2}{386.4} = 14.7$$

Total thrust $= 2050 + (7.35 \times 13) = 2146$ lbs.

Cotangent of required contact angle $= \frac{2146}{369} = 5.82$

Hence $\theta = 9.75°$

It will be appreciated from the foregoing that a thrust bearing has been provided in which the excessive wear and other defects of prior devices are substantially eliminated.

I claim:

1. A thrust bearing assembly for use with a shaft operating during normal operation with a constant predetermined axial thrust and at a high speed which is within a limited predetermined range, comprising a main bearing and a locating bearing, said main bearing being defined by the inwardly inclined surface of a first axially fixed annular race facing substantially parallel to the axis and the inwardly inclined surface of a second opposed annular race secured on the shaft and facing substantially parallel to the axis, said first and second races relatively rotating at a speed within the said predetermined range and being mounted so as to be capable of a small amount of relative axial displacement, said locating bearing being defined by the inwardly inclined surface of a third axially fixed annular race facing substantially parallel to the axis and oppositely to the first race and the inwardly inclined surface of a fourth annular race fixed on the shaft facing substantially parallel to the axis and opposite to the third race, the third and fourth races relatively rotating at a speed within the said predetermined range and each of the third and fourth races being in fixed axial relationship with the first and second races respectively, balls in both bearings, the balls in the bearings being of such mass and at such distances from the shaft axis and the contact angles of the balls with the races being such that the balls of the main bearing exert a substantially greater axial component of centrifugal force than the balls of the locating bearing, the axially fixed race of the main bearing facing in the direction from which said thrust is exerted, the contact angles made by the balls and the inwardly inclined surfaces of the races being such that the axial thrust component of the centrifugal force of the balls in the main bearing under normal operating conditions balances the total of the applied axial thrust and the axial thrust component of the centrifugal force of the balls in the locating bearing under the same conditions, and wherein the balls are in a condition of equilibrium in contact only with the spacing elements and the outer inwardly inclined surfaces of the races.

2. A device as claimed in claim 1, in which the balls of the main bearing are heavier than the balls of the locating bearing.

3. A device as claimed in claim 2, in which the contact angle of the balls of the locating bearing with the fourth race is substantially greater than the contact angle of the balls of the main bearing with the second race.

4. A device as claimed in claim 1, in which the contact angle of the balls of the locating bearing with the fourth race is substantially greater than the contact angle of the balls of the main bearing with the second race.

5. A thrust bearing assembly for use with a shaft operating during normal operation with a constant predetermined axial thrust and at a high speed which is within a limited predetermined range, comprising a main bearing and a locating bearing, said main bearing being defined by the inwardly inclined surface of a first axially fixed annular race facing substantially parallel to the axis and the inwardly inclined surface of a second opposed annular race secured on the shaft and facing substantially parallel to the axis, said first and second races relatively rotating at a speed within the said predetermined range and being mounted so as to be capable of a small amount of relative axial displacement, said locating bearing being defined by the inwardly inclined surface of a third axially fixed annular race facing substantially parallel to the axis and oppositely to the first race and the inwardly inclined surface of a fourth annular race fixed on the shaft facing substantially parallel to the axis and opposite to the third race, the third and fourth races relatively rotating at a speed within the said predetermined range and each of the third and fourth races being in fixed axial relationship with first and second races respectively, balls in both bearings, the axially fixed race of the main bearing facing in the direction from which said thrust is exerted, the mass and number of balls in the bearings and their distance from the shaft axis and the contact angles of the balls with the races being defined by the formula $$\cot \theta = \frac{2gT + \cot \theta' W' R' w^2 n'}{W R w^2 n}$$

where $\theta$ and $\theta'$ are the contact angles of the balls with the second and fourth races, respectively; $g$ is gravitational acceleration; T is the thrust on the shaft; W and W' are the weight of each ball of the main and locating bearings, respectively; R and R' are the distances from the shaft axis of the centres of the balls of the main and locating bearings, respectively; $w$ is the speed of rotation of the shaft; and $n$ and $n'$ are the number of balls in the main and locating bearings, respectively.

References Cited in the file of this patent

UNITED STATES PATENTS

| | | |
|---|---|---|
| 1,219,920 | Collins | Mar. 20, 1917 |
| 1,288,276 | Symanzik | Dec. 17, 1918 |
| 1,796,539 | Sauer | Mar. 17, 1931 |

FOREIGN PATENTS

| | | |
|---|---|---|
| 248,263 | Italy | Jan. 9, 1926 |